Figure 1:
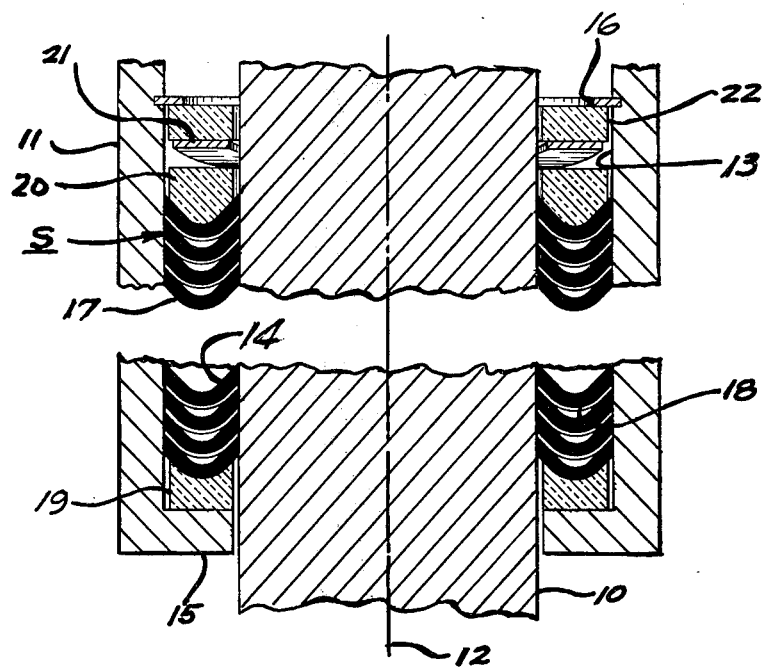

United States Patent [19]

Nixon et al.

[11] 4,160,551

[45] Jul. 10, 1979

[54] SEAL ASSEMBLY

[75] Inventors: Jeddy D. Nixon; Fred K. Fox, both of Houston, Tex.

[73] Assignee: Engineering Enterprises, Inc., Houston, Tex.

[21] Appl. No.: 838,556

[22] Filed: Oct. 3, 1977

[51] Int. Cl.² .............................................. F16J 15/24
[52] U.S. Cl. ................................ 277/124; 277/235 R; 277/DIG. 6
[58] Field of Search ............... 277/203, 204, 123, 124, 277/117, 118, DIG. 6, 135 R

[56] References Cited

U.S. PATENT DOCUMENTS

| | | | |
|---|---|---|---|
| 3,520,542 | 7/1970 | Fruehauf | 277/118 |
| 3,573,873 | 4/1971 | Pearson | 277/203 |
| 3,905,090 | 9/1975 | Painter | 277/204 |
| 4,006,881 | 2/1977 | Gaillard | 277/124 |

*Primary Examiner*—Robert I. Smith

[57] ABSTRACT

There is disclosed a seal assembly comprising alternate, generally "V"-shaped layers of graphite and a spring metal which are nested one within the other for sealing between the relatively movable, generally coaxial cylindrical surfaces of an annular recess in which the assembly is contained.

9 Claims, 2 Drawing Figures

SEAL ASSEMBLY

This invention relates to an improved assembly for sealing between inner and outer, generally coaxially arranged, relatively movable cylindrical surfaces. In one of its aspects, it relates to such an assembly for sealing between the cylindrical surfaces of relatively rotatable members, such as a shaft rotatable within an outer housing.

The well-known Chevron type seal assembly often used for this purpose consists of "V"-shaped rings of rubber or rubber composition which are nested one within the other. When the assembly is contained within an annular recess between such members, the predominant fluid pressure on one end thereof urges their outer edges against the cylindrical surfaces of the recess. Even though these surfaces will not remain exactly concentric during their relative axial rotation, the resiliency of the rubber or rubber composition maintains the outer edges of the rings in tight sealing engagement therewith regardless of the pressure differential across the assembly.

However, conventional rubber or rubber composition sealing materials are unable to withstand temperature of 325° F. or more which are encountered in many environments, such as downhole tools used in the drilling of oil and gas wells. Furthermore, since rubber is an insulating material, it does not serve to conduct heat generated between the inner circumference of the seal assembly and the outer surface of the shaft of these or similar tools to the other housing where it may be dissipated.

Graphite is a sealing material which is unaffected by these high temperatures and is a good heat conductor. However, graphite is not resilient, so that, when deformed, it will not return to its original shape. Consequently, prior seal assemblies using graphite for sealing between inner and outer sealing cylindrical surfaces which do not remain exactly concentric require a gland nut or the like for applying an expanding force thereto. This, of course, does not permit the assembly to be used for sealing between remotely located cylindrical surfaces, such as in a well tool.

It is therefore the primary object of this invention to provide a seal assembly in which graphite may be used as a substitute for the rubber or rubber composition materials at such remote locations; and, more particularly, to provide such an assembly wherein the graphite is so arranged that when deformed, it will automatically return to its original shape and thus maintain sealing engagement with the relatively movable surfaces.

Another object is to provide such an assembly consisting of parts which, like graphite, are inert and which serve to conduct heat from the inner to the outer member.

These and other objects are accomplished, in accordance with the illustrated embodiments of the present invention, by a seal assembly which comprises alternate, generally "V"-shaped layers of graphite and a spring metal which are nested within one another and which have inner and outer diameters approximating the diameters of the inner and outer cylindrical surfaces of the recesses. More particularly, the layers are sufficiently thin to permit them to be flexed about their apices, in response to the predominant fluid pressure on one end of the assembly, whereby the metal layers serve to extrude or deform the inner and outer edges of the graphite layers into sealing engagement with cylindrical surfaces of the recess. The metal layers will of course conduct heat generated between the relatively rotating inner member and seal assembly to the outer member where it may be dissipated.

Preferably, each graphite layer is made of a ribbon of compressed powders which is available from commercial sources. The material of the spring metal layers is, in addition to being heat-conductive, different from that of which the outer cylindrical surface of the inner member is formed so as to avoid serious galling between the two. Preferably, the metal layer is made of material, such as berrylium copper, having a modulus elasticity of 17 million or above at 200° C., and a heat transfer coefficient at least 70% that of copper. In addition, because of the low coefficient of friction between them, berrylium copper will not score or damage the outer cylindrical surface of the inner body when made of a precious material such as chrome oxide.

Furthermore, berrylium copper, which is commonly used in watch springs, maintains its spring characteristics even at high temperatures, is easy to form into a "V" shape, and is non-magnetic and relatively inert. The berrylium copper is also advantageous, when used to seal a fluid such as molten Wood's Metal, in that it will plate, which would not be possible if the metal were steel, for example. Alternatively, however, other metals having similar characteristics, such as berrylium nickel and phosphur bronze, may be used. When using alternate layers of berrylium copper and graphite ribbon, the berrylium copper layers may be 0.004 inches thick and the graphite layers may be 0.08 inches thick.

In the preferred embodiments of the invention, the alternate layers are preloaded by an axial force which prevents them from rotating relatively to one another. This is particularly helpful when there is relatively little pressure differential to be sealed, and thus only a small frictional force to prevent their rotation.

Figure 2:
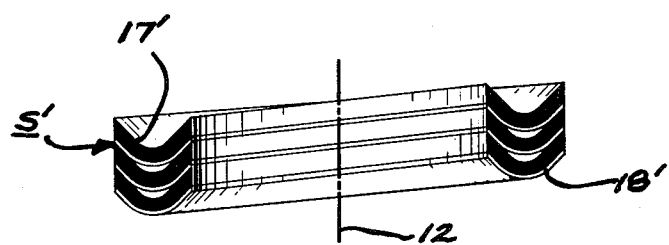

In the drawings, wherein like reference characters are used throughout to designate like parts:

FIG. 1 is a cross-sectional view, interrupted intermediate its length, of a seal assembly constructed in accordance with the present invention and contained within an annular recess between inner and outer, relative rotating members for sealably engaging therewith; and FIG. 2 is a cross-sectional view of a part of another seal assembly, removed from within the recess and constructed in accordance with an alternative embodiment of the present invention.

With reference now to the details of the above-described drawings, the apparatus shown in FIG. 1 includes an inner member 10, which may be a shaft, extending concentrically within an outer member 11, which may be an outer housing. Either or both of the members is adapted to rotate, and thus there is relative rotation between them, about their common axis 12. The outer member has an inner cylindrical surface 13 which is spaced concentrically of an outer cylindrical surface 14 of the inner member to form an annular recess between them.

Seal assembly S is contained within the recess for sealably engaging between the cylindrical surfaces of the members in order to contain a predominant fluid pressure above it. The assembly is supported on an upwardly extending flange 15 of the outer member, and a snap ring 16 is removably fitted within a groove in the inner cylindrical surface 13 of the outer member for preventing upward movement of the seal assembly out of the recess.

As previously described, the seal assembly comprises alternate, generally "V"-shaped layers 17 and 18 of graphite and metal, respectively, which are nested one within the other and which have inner and outer diameters which approximate the inner and outer cylindrical surfaces of the recess. More particularly, the rings are sufficiently thin that in addition to being easily deformable into a "V" shape, they are flexible about their apices, so that they may be easily slid downwardly into supported position in the recess. As indicated by the interruption or discontinuity of FIG. 1, there may be a large number of such layers, as in a Chevron type packing.

In this embodiment, each layer is a separate, discrete ring of graphite or metal. The lower end of the lowermost ring fits within the upper, generally "V"-shaped end of a base ring 19 which rests on the upper side of flange 15. An expander ring 20 having lower, generally "V"-shaped end fits closely within the upper end of the uppermost ring.

When the assembly is disposed within the recess, the inner and outer edges of at least some of the rings will engage with the cylindrical surfaces of the recess and thus form an initial seal therewith. Then, when subjected to the predominant fluid pressure above the assembly, the rings are flexed so as to urge their inner and outer edges into tight sealing engagement with the recess surfaces. When so flexed, the metal rings will deform or extrude the graphite rings therebelow and thus maintain their inner and outer edges thereof in tight sealing engagement with the recess surfaces, despite the lack of exact concentricity thereof. As also illustrated, the upper surface of each graphite ring is formed of a somewhat deeper "V" shape than the bottom side of the metal ring thereabove, so that there is room for the apex of the metal ring to move downwardly as it is caused to flex.

As previously described, the metal rings are formed of berrylium copper which, in addition to its spring characteristics, differs from the material of which the outer cylindrical surface of the inner member 10 is made, which may be chrome oxide, so as to avoid serious galling between them, even though the inner edges of the metal rings may rub against it. As previously mentioned, due to the low coefficient of friction between them, the edges of berrylium copper rings will not seriously gall or score the outer surface of an inner member. Also, since berrylium copper is a good heat conductor, engagement of the edges of the metal rings with the cylindrical surfaces of the inner and outer members is very effective in transmitting heat generated between the relatively rotating outer surface of the inner member and the inner diameter of the seal assembly from the inner member outwardly to the outer member, where it may be dissipated more rapidly.

If the differential between the predominant pressure to be contained above the recess S and that below the seal assembly is relatively large, it will provide the force necessary to prevent rotation of the rings relative to one another. However, in order to lessen the likelihood of such rotation in the event pressure differential is small, a wavy type spring 21 is disposed between the upper side of expander ring 20 and a retainer ring 22 held beneath split ring 16. The spacing between the split ring and the upper side of the flange 15 is such that the wavy spring 21 applies an axial preload to the rings of the seal assembly.

The embodiment of seal assembly S' disclosed in FIG. 2 differs from that of FIG. 1 only in that the layers 18' and 19' of graphite and spring metal are not made of discrete rings, but instead of lengths of the to materials would in spiral fashion about their common axis 12. Alternatively, the rings could be discrete, but skewed at an acute angle with respect to a plane perpendicular to the axes of the rings. Both arrangements have the added advantage of disposing the inner surfaces of the layers of the seal assembly, which rotate relative to the outer surface of the inner member, at a small acute angle with respect to the axis 12, thereby distributing wear over a large surface area of the inner member during use of the seal assembly.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limited sense.

The invention having been described, what is claimed is:

1. In apparatus wherein an annular recess is formed between the inner and outer, generally concentrically arranged cylindrical surfaces of relatively movable members; an improved assembly contained within the recess for sealing between said surfaces, comprising alternate, generally "V"-shaped layers of graphite and a spring metal which are nested within one another and which have inner and outer diameters approximating the diameters of the inner and outer cylindrical surfaces, respectively, of the recess, said layers being sufficiently thin to permit them to be flexed about their apices, in response to the predominant fluid pressure on one end of the assembly, whereby the metal layers deform the graphite layers so as to maintain their inner and outer edges sealably engaged with said recess surfaces.

2. Apparatus of the character defined in claim 1, wherein each graphite layer is formed of a powdered graphite pressed into a ribbon.

3. Apparatus of the character defined in claim 1, wherein each metal layer is of a different material than that of the outer cylindrical surface of the inner member.

4. Apparatus of the character defined in claim 1, wherein each metal layer has a heat transfer coefficient at least that of copper.

5. Apparatus of the character defined in claim 1, wherein each metal layer has a modulus of elasticity of 30 million or above at 200° C.

6. Apparatus of the character defined in claim 1, wherein each metal layer is berrylium copper.

7. Apparatus of the character defined in claim 6, wherein the outer cylindrical surface of the inner member is chrome.

8. Apparatus of the character defined in claim 6, wherein each metal layer is about 0.004" thick, and each graphite layer is about 0.08" thick.

9. Apparatus of the character defined in claim 1, including a spring at one end of the assembly for applying an axial preloading force thereto.

* * * * *